United States Patent
Fukumoto

(10) Patent No.: US 11,392,227 B2
(45) Date of Patent: Jul. 19, 2022

(54) DOUBLE-WHEEL ASSEMBLY

(71) Applicant: Microsoft Technology Licensing, LLC, Redmond, WA (US)

(72) Inventor: Masaaki Fukumoto, Shenzhen (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/964,925

(22) PCT Filed: Feb. 5, 2018

(86) PCT No.: PCT/CN2018/075323
§ 371 (c)(1),
(2) Date: Jul. 24, 2020

(87) PCT Pub. No.: WO2019/148505
PCT Pub. Date: Aug. 8, 2019

(65) Prior Publication Data
US 2021/0041963 A1 Feb. 11, 2021

(51) Int. Cl.
*G06F 3/0362* (2013.01)
*G06F 3/0354* (2013.01)
*G06F 3/0485* (2022.01)

(52) U.S. Cl.
CPC ........ *G06F 3/0362* (2013.01); *G06F 3/03543* (2013.01); *G06F 3/0485* (2013.01)

(58) Field of Classification Search
CPC .. G06F 3/03543; G06F 3/0485; G06F 3/0362; G06F 3/016
See application file for complete search history.

(56) References Cited

U.S. PATENT DOCUMENTS 5,095,303 A * 3/1992 Clark .................. G05G 1/01
345/164
6,031,518 A * 2/2000 Adams ............... G06F 3/03543
345/156
(Continued)

FOREIGN PATENT DOCUMENTS

BR    PI0904503 A2    5/2011
CN    2456222 Y       10/2001
(Continued)

OTHER PUBLICATIONS

"Ami Mouse 300 Dual Scroll", Retrieved from: https://www.trust.com/en/product/12534-ami-mouse-300-dual-scroll, Nov. 28, 2017, 3 Pages.
(Continued)

*Primary Examiner* — Ariel A Balaoing
(74) *Attorney, Agent, or Firm* — Schwegman Lundberg & Woessner, P.A.

(57) ABSTRACT

A scroll assembly (10) for use with a pointing device (100), comprises: a first scroll member (1) for controlling a first movement of an object on a user interface; and at least one second scroll member (2) for controlling a second movement of the object on the user interface, the second scroll member (2) being adapted to, in response to an operation applied substantially in the first direction (Y), rotate and provide a haptic feedback in a second direction (X) that is substantially perpendicular to the first direction (Y).

20 Claims, 6 Drawing Sheets

(56) References Cited

U.S. PATENT DOCUMENTS

| | | | |
|---|---|---|---|
| 6,492,976 B1* | 12/2002 | Wang | G06F 3/0312 250/231.13 |
| 7,616,188 B1 | 11/2009 | Blandin et al. | |
| 2003/0025673 A1* | 2/2003 | Ledbetter | G06F 3/0312 345/163 |
| 2003/0107603 A1 | 6/2003 | Clapper | |
| 2004/0189605 A1 | 9/2004 | Shih | |
| 2005/0225531 A1 | 10/2005 | Cheng | |
| 2006/0001657 A1* | 1/2006 | Monney | G06F 3/0312 345/184 |
| 2008/0010616 A1* | 1/2008 | Algreatly | G06F 3/0346 715/856 |
| 2008/0150893 A1 | 6/2008 | Ofer | |
| 2008/0192010 A1 | 8/2008 | Lin | |
| 2009/0273564 A1* | 11/2009 | Glaser-Seidnitzer | G06F 3/0213 345/161 |
| 2009/0292990 A1* | 11/2009 | Park | G06F 3/016 715/702 |
| 2010/0085306 A1* | 4/2010 | Wu | G06F 3/03543 345/163 |
| 2016/0378189 A1* | 12/2016 | Moussette | G06F 3/0362 345/173 |
| 2017/0052609 A1* | 2/2017 | Huda | G06F 3/0485 |
| 2017/0285768 A1* | 10/2017 | Bruwer | G06F 3/0362 |
| 2019/0079584 A1* | 3/2019 | Bonanno | G06F 3/016 |
| 2019/0094994 A1* | 3/2019 | Tsai | G06F 3/0362 |

FOREIGN PATENT DOCUMENTS

| | | |
|---|---|---|
| CN | 201000609 Y | 1/2008 |
| CN | 201044088 Y | 4/2008 |
| CN | 201741116 U | 2/2011 |
| CN | 201788477 U | 4/2011 |
| CN | 101727207 B | 7/2012 |
| CN | 202677316 U | 1/2013 |
| JP | 2003108308 A | 4/2003 |
| JP | 2004288089 A | 10/2004 |
| WO | 0101335 | 1/2001 |
| WO | 2008003331 A1 | 1/2008 |

OTHER PUBLICATIONS

"GE H097769 Deluxe Optical Mouse", Retrieved from: https://web.archive.org/web/20141130142704/https://www.amazon.com/GE-HO97769-Deluxe-Optical-Mouse/product-reviews/B00009UHEG, Nov. 30, 2014, 4 Pages.

"Microsoft Surface Arc Mouse", Retrieved from: https://support.microsoft.com/en-us/help/4052292/accessories-use-microsoft-arc-mouse, Nov. 28, 2017, 3 Pages.

"MX Master thumb wheel scroll", Retrieved from: https://support.logi.com/hc/en-us#l/s/question/0D53100005BXtqiCAD/mx-master-thumb-wheel-scroll, Aug. 3, 2016, 3 Pages.

"Wireless BatteryFree Mouse Pro", Retrieved from: https://sandberg.world/en-gb/product/Wireless-BatteryFree-Mouse-Pro, Nov. 28, 2017, 5 Pages.

Deleon, Nicholas, "Buffalo Mouse With D-Pad: H-Scrolling FTW", Retrieved from: https://gizmodo.com/buffalo-mouse-with-d-pad-h-scrolling-ftw-241072, Feb. 3, 2007, 3 Pages.

Fenlon, Wes, "Patriot Defies God and Man, Puts two Scroll Wheels on Gaming Mouse", Retrieved from: https://web.archive.org/web/20150604181238/http://www.pcgamer.com/patriot-defies-god-and-man-puts-two-scroll-wheels-on-gaming-mouse/, Jun. 3, 2015, 4 Pages.

"International Search Report and Written Opinion Issued in PCT Application No. PCT/CN2018/075323", dated Oct. 12, 2018, 10 Pages.

"Extended European Search Report Issued in Application No. 18904183.3", dated Aug. 10, 2021, 10 Pages.

"Office Action Issued in Indian Patent Application No. 202017033209", dated Apr. 7, 2022, 6 Pages.

* cited by examiner

DOUBLE-WHEEL ASSEMBLY

CROSS-REFERENCE TO RELATED APPLICATION

This application is a U.S. National Stage Filing under 35 U.S.C. 371 of International Patent Application Serial No. PCT/CN2018/075323, filed Feb. 5, 2018, and published as WO 2019/148505 A1 on Aug. 8, 2019, which applications and publication are incorporated herein by reference in their entirety.

BACKGROUND

Among various input devices, mouse is widely used for facilitating the location of a cursor at a target position or scrolling the content of a document displayed on a webpage, for example. In additional to several buttons (such as, the left click button and right click button), most mice are also provided with a scroll wheel (also called a roller or a thumbwheel). Such wheel can be scrolled by a finger, and the rotation of the wheel is subsequently measured and converted to various input signals to realize scrolling, zooming and other operations to the content on the display. Therefore, mouse especially the wheel thereof has a direct impact on the operation efficiency and user experience.

SUMMARY

Implementations of the subject matter described herein provide a scroll assembly for use with a pointing device, which enables the quick and comfortable operation while providing the improved intuitiveness. The scroll assembly includes a first scroll member for controlling a first movement of an object on a user interface and a second scroll member for controlling a second movement of the object on the user interface The second scroll member is adapted to, upon an operation applied substantially in the first direction, rotate and provide a haptic feedback in a second direction that is substantially perpendicular to the first direction.

In this way, a quick and comfortable scroll operation can be achieved via the flexion or extension joint movement of a finger. In the meantime, with the haptic feedback received from each scroll member during the operation, the intuitive connection between the user's feeling while scrolling the respective member and the corresponding scrolling direction of the object on the display can be well established.

It is to be understood that the Summary is not intended to identify key or essential features of implementations of the subject matter described herein, nor is it intended to be used to limit the scope of the subject matter described herein. Other features of the subject matter described herein will become easily comprehensible through the description below.

BRIEF DESCRIPTION OF THE DRAWINGS

The above and other objectives, features and advantages of the subject matter described herein will become more apparent through more detailed depiction of example implementations of the subject matter described herein in conjunction with the accompanying drawings, wherein in the example implementations of the subject matter described herein, same reference numerals usually represent same components.

DETAILED DESCRIPTION

The subject matter described herein will now be discussed with reference to several example implementations. It should be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The term "one implementation" and "an implementation" are to be read as "at least one implementation." The term "another implementation" is to be read as "at least one other implementation." The terms "first," "second," and the like may refer to different or same objects. Other definitions, explicit and implicit, may be included below. A definition of a term is consistent throughout the description unless the context clearly indicates otherwise.

A typical function of a scroll wheel is to convert user's scroll operation to a scrolling of the content/object on the display. Majority of the scroll wheels are vertically oriented and thus can be used to convert the applied flexion or extension movement by a finger to a vertical scrolling of the content on the display.

However, some actions may require a horizontal movement of the contact on the display. For example, the view/lookup of an item in a "long" object, such as an Excel spreadsheet with hundreds or even thousands of columns in the horizontal direction. For those cases, conventionally the user might need to click the left button and drag and drop the horizontal scroll bar to the destination point. Such drag and drop operation in horizontal direction, especially for a frequent operation or long distance movement, negatively influences the operation efficiency and the user's experience. In some conventional designs, an additional wheel, tilt-wheel, seesaw-switch, touchpad, or buttons is equipped with the mouse to facilitate the horizontal scrolling. However, those designs either does not support quick and comfortable operation or fail to establish an intuitive link between the user's feel and the corresponding scrolling direction of the object on the display.

Figure 1A:
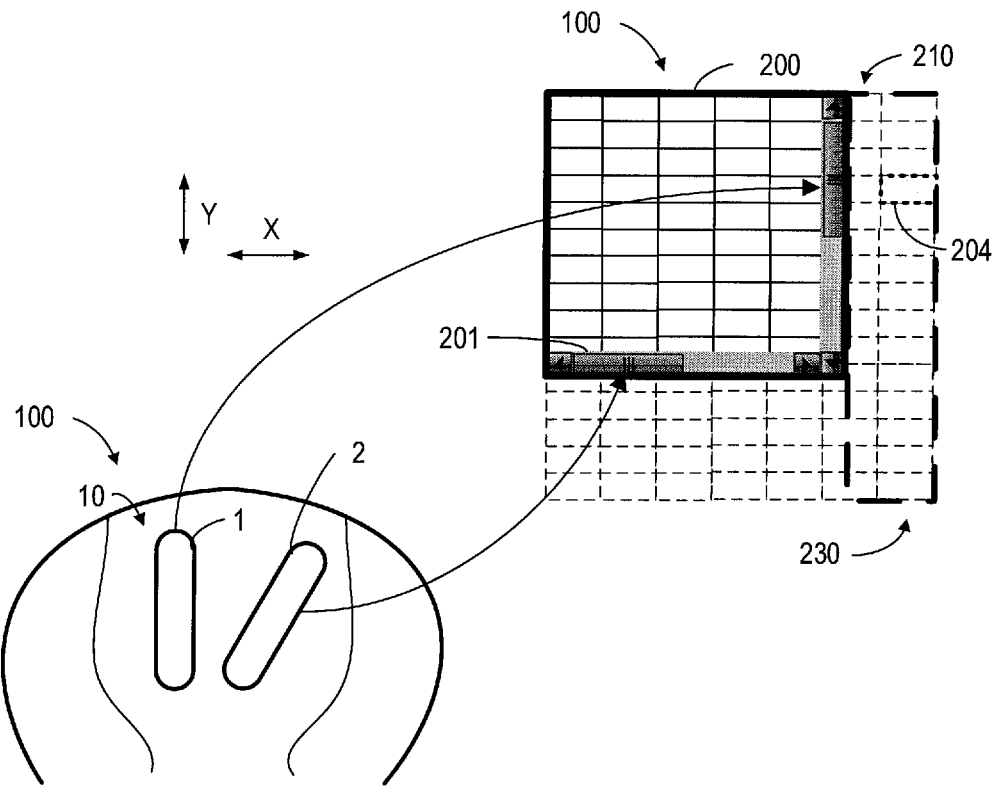
FIG. 1A schematically illustrates an example input system with a mouse including a scroll wheel assembly according to an implementation of the subject matter described herein.

FIG. 1A schematically illustrates an example system 1000 including a pointing device 100 for receiving the user's input and a display screen 200 for providing a user interface (UI). The pointing device 100 is configured to convert the user's input as various operations to the content on the display screen 200. For ease of illustration, implementations of the subject matter herein are described with reference to the horizontal and vertical directions. It is to be understood that other directions are also possible depending on different types of pointing devices. It is also to be understood that the display screen 200 is only an example UI for ease of illustration without suggesting any limitations as to the scope of the subject matter described herein.

As further shown in FIG. 1A, the object as shown on the display screen 200 is a spreadsheet 210 with so many columns (in the horizontal direction X) and lines (in the vertical direction Y) that the displayed region 220 of the display screen 200 is not large enough to display all the cells of the worksheet 210 (In this example, the invisible regions are illustrated with dashed lines). In this case, in order to view a cell 240 located in the invisible region 230 of the display screen 200, conventionally, the user might need to click the left button and drag and drop the horizontal scroll bar 201. Such drag and drop operation in horizontal direction, especially for a long distance, negatively influences the operation efficiency and the user's experience.

According to various implementations of the subject matter, the scroll assembly 10 are equipped with two scroll members, namely, a first scroll wheel 1 and a second scroll wheel 2 as shown in FIG. 1A. It is to be appreciated that for ease of illustration, the scroll member throughout the present disclosure is described with reference to the scroll wheel. Other forms of scroll members are also possible.

The first scroll wheel 1 can be operated to, upon receiving a first scroll manipulation applied in a first direction, generate a first signal to a controller of the pointing device 100 for controlling a first movement of an object on a display screen, and the second scroll wheel 2 can be operated to, upon receiving a second scroll manipulation applied substantially in the first direction Y generate a second signal to the controller for controlling a second movement of the object. In this example, the first movement is defined as the scroll of the object displayed on the display screen 200 in the vertical direction, and the second movement is defined as the scroll of the object displayed on the display screen 200 in the horizontal direction.

As further illustrated in FIG. 1A, the first scroll wheel 1 is arranged in a first direction Y for receiving the user's scroll operation substantially in the first direction Y. In this example, the first direction Y is defined as the vertical direction. For the second scroll wheel 2, when a user applies an operation substantially in the first direction Y, the second scroll wheel 2 will rotate, and meanwhile, providing a haptic feedback in a second direction X that is substantially perpendicular to the first direction Y. In this example, the second direction X is defined as a horizontal direction. In this way, the first scroll wheel 1 can be operated as a typical scroll wheel to perform the vertical scroll operation on the display screen 200, and the second scroll wheel 2 can be operated to enable a horizontal scroll operation on the display screen 200.

Figure 1B:
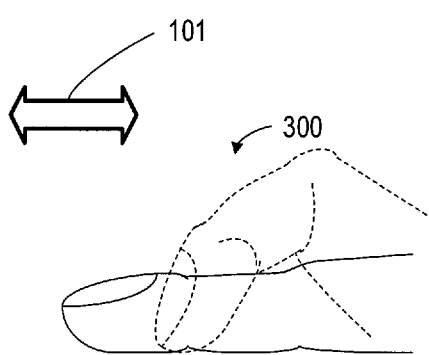
FIG. 1B schematically illustrates a flexion or extension finger movement.

Moreover, the user may comfortably apply the flexion or extension action on each of the two wheels, while receiving a corresponding haptic feedback (or feel) that reflects the scroll direction of the object shown on the display screen 200. FIG. 1B schematically illustrates a flexion or extension finger movement 101. As such, a quick and comfortable scroll operation on both scroll wheels can be achieved. In the meantime, the intuitive link between the user's feeling whiling scrolling the respective wheel and the corresponding scrolling direction of the object on the display can be well established.

Figure 1C:
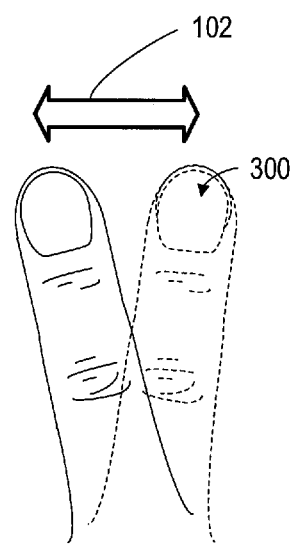
FIG. 1C schematically illustrates an abduction or adduction finger movement.

In some conventional design, an additional wheel may be horizontally arranged, tilt-wheel, seesaw-switch, or touchpad are also used for horizontal scrolling. However, such design may require an abduction or adduction action of the finger, which is not suitable for quick and frequent movement, and thus would deteriorate the operation speed and easily cause fatigue of the finger. FIG. 1C schematically illustrates an abduction or adduction finger movement 102. In some other conventional designs, an additional wheel may be arranged in parallel with the vertically arranged scroll wheel, which may allow fast finger operation via flexion or extension. However, such designs cannot provide the horizontal movement feel and thus decreases the intuitiveness.

It is to be noted that FIG. 1A only schematically shows a wheel assembly 10 for ease of illustration. Possible designs with detailed design information including shapes and orientations of the second scroll wheel 2 will be further described with reference to FIGS. 2A-8D as below.

Figure 2A:
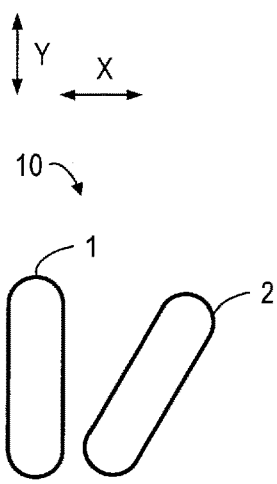
FIG. 2A shows an example scroll wheel assembly according to an implementation of the subject matter described herein.

FIG. 2A shows an example wheel arrangement of a scroll wheel assembly 10 according to an implementation of the subject matter described herein. In this example, the first scroll wheel 1 is arranged in a first direction Y, and the second scroll wheel 2 is adjustably arranged in a third direction having a non-90 first degree β with respect to the orientation of the first wheel, that is, the first direction Y.

Figure 2B:
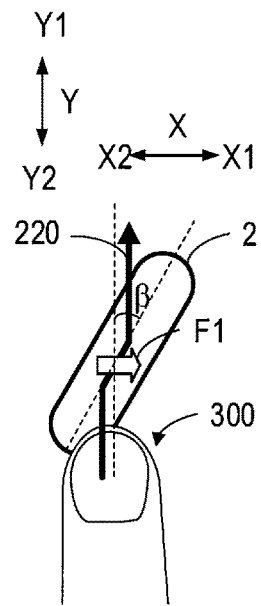
FIG. 2B illustrates an upward scroll operation applied on a second scroll wheel of the scroll wheel assembly of FIG. 2A.

The working principle of the interaction between user's finger 300 with the second scroll wheel 2 as shown in FIG. 2A can be illustrated with reference to FIGS. 2B-2C. FIG. 2B illustrates a scenario when a user's finger is applying an extension (upward) on the second scroll wheel 2. As shown, when the user's finger applies an extension along the first positive direction Y1 on the surface of the second scroll wheel 2. The applied force can be decomposed into two force components via the tilted wheel arrangement, with one force component pointing to the second negative direction X2 and the other force component pointing to the third direction. The force component pointing to the third direction causes the rotation of the second scroll wheel 2, while the force component pointing to the second negative direction X2 causes the second scroll wheel 2 to provide a reaction force F1 to the finger 300 and thereby giving the user a haptic feedback in the in the second positive direction X1, or in other words, a horizontal movement feel to the right.

Figure 2C:
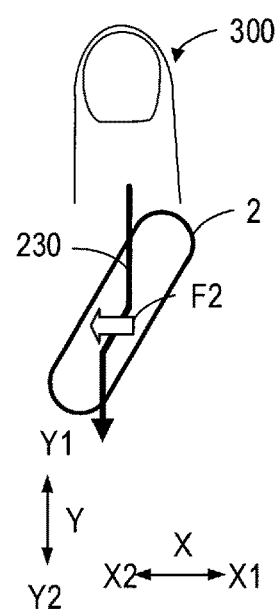
FIG. 2C illustrates a downward scroll operation applied on the second scroll wheel the scroll wheel assembly of FIG. 2A.

FIG. 2C illustrates a scenario when a user's finger 300 is applying flexion (downward) on the second scroll wheel 2. As shown, when the user's finger 300 applies a flexion along the first negative direction Y2 on the surface of the second scroll wheel 2. The applied force can be decomposed into two force components via the tilted wheel arrangement in a similar manner as shown in FIG. 2B, with one force component pointing to the second positive direction X1 and the other force component pointing to the third direction. Likewise, the force component pointing to the third direction causes the rotation of the second scroll wheel 2, while the force component pointing to the second positive direction X1 causes the second scroll wheel 2 to provide a reaction force F2 to the finger 300 and thereby giving the user a haptic feedback in the second negative direction X2, or in other words, a horizontal movement feel to the left.

The trajectories of the finger 300 with respect to the second scroll wheel 2 are respectively illustrated by the arrows 220 and 230 as shown in FIG. 2B and FIG. 2C. As shown, during the time of interaction between the finger 300 and the surface of the second scroll wheel 2, the finger 300 is forced to change the trajectory from the first direction Y to the third direction and then back to the first direction Y. In other words, the frictional force existed between the finger 300 and the surface of the second scroll wheel 2 during the interaction will lead the finger 300 to follow the rotation of the second scroll wheel 2 along the third direction a little, till the finger 300 is away from the contact surface of the second scroll wheel 2.

It is to be understood that first angle β is directly related to the haptic effect. For example, larger first angle β can provide stronger feel, while smaller first angle β can provide quicker operation. In this case, user may adjust the orientation of the second scroll wheel 2 depending on his/her the preference, which enhances the design flexibility of the wheel assembly 10. For example, in some implementations, the first angle β can be set in a range of 15 to 35 degrees.

Figure 2D:
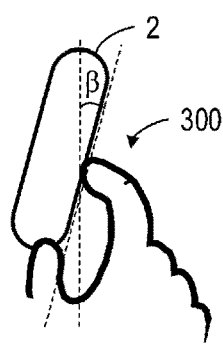
FIG. 2D illustrates a scroll operation applied on a side wall of the second scroll wheel the scroll wheel assembly of FIG. 2A.
Figure 2E:
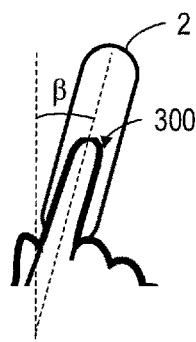
FIG. 2E illustrates a scroll operation applied on the second scroll wheel the scroll wheel assembly of FIG. 2A with a slanted finger.

Depending on user's operation preference/habit, other operation methods may likewise bring the haptic feedback. For example, as illustrated in FIG. 2D, the user may also feel the horizontal scroll when the finger 300 slides a "slanted" side wall of the second scroll wheel 2 to rotate the second scroll wheel 2. As another example, as illustrated in FIG. 2E, the user may also feel the horizontal scroll when the user operates the second scroll wheel 2 with a "slanting" finger that is oriented in line with the orientation of the second scroll wheel 2, that is, the third direction. Such operation ways may further enhance the haptic feedback to the user by using "slanted" finger movement.

Figure 3A:
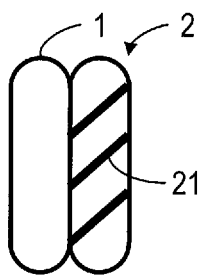
FIG. 3A shows another example scroll wheel assembly according to an implementation of the subject matter described herein.
Figure 3B:
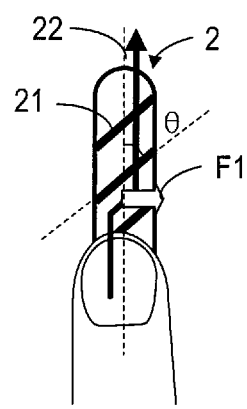
FIG. 3B illustrates an upward scroll operation applied on a second scroll wheel of the scroll wheel assembly of FIG. 3A.
Figure 3C:
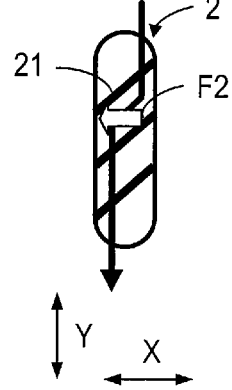
FIG. 3C illustrates a downward scroll operation applied on the second scroll wheel of the scroll wheel assembly of FIG. 3A.

FIG. 3A shows another example wheel arrangement of a scroll wheel assembly 10 according to an implementation of the subject matter described herein. Compared to the example wheel arrangement as shown in FIGS. 2A-2C, in this example, the first scroll wheel 1 is arranged in a first direction Y, while the second scroll wheel 2 is also arranged in the first direction Y. Further, the second scroll wheel 2 includes one or more surface structures 21 extending in a fourth direction having a non-90 second angle θ with respect to an orientation of the second scroll wheel 2, such as the profile centerline 22 of the second scroll wheel 2. In some implementations, the surface structures 21 can be ribs or trenches or the combination thereof.

The working principle of the interaction between user's finger 300 with the second scroll wheel as shown in FIG. 3A is similar to that illustrated with reference to FIGS. 2B-2C. Briefly, when the user's finger 300 applies an extension (FIG. 3B) or flexion (FIG. 3C) along the first direction Y on the surface of the second scroll wheel 2. The applied force likewise can be decomposed into two force components via the tilted surface feature 21, with one force component pointing to the second direction X and the other force component pointing to the third direction. Again, the force component pointing to the third direction causes the rotation of the second scroll wheel 2, while the force component pointing to the second direction X causes the second scroll wheel 2 to provide a reaction force F1 or F2 to the finger 300 and thereby giving the user a haptic feedback in the in the second direction X, or in other words, a horizontal movement feel.

Like the trajectories of the finger 300 described with reference to FIG. 2B and FIG. 2C, in this design, the force generated between the finger 300 and the surface structure 21 during the interaction will likewise lead the finger 300 to follow the rotation of the second scroll wheel 2 along the fourth direction a little, till the finger 300 is away from the surface structure 21 of the second scroll wheel 2.

In such design, since the two scroll wheels can be arranged in parallel and close to each other, the space requirement within the pointing device 100 to accommodate the wheel assembly 10 can be reduced, which would be helpful to achieve the miniaturization of the pointing device 100.

In some implementations, the second degree θ can be approximately 45 degrees. Other design parameters such as number, width and height of the rib or trench can also be adjusted to meet the user's preference. In an example implementation with multiple ribs as the surface structures 21, the diameter of the second scroll wheel 2 is approximately 22 mm, the number of ribs is 10, the second degree θ is 45 degrees, and the width of each rib is 1 mm. It is also to be understood that the haptic feedback is also adjustable via the tuning of the above discussed design parameters depending on the user's preference.

Figure 4:
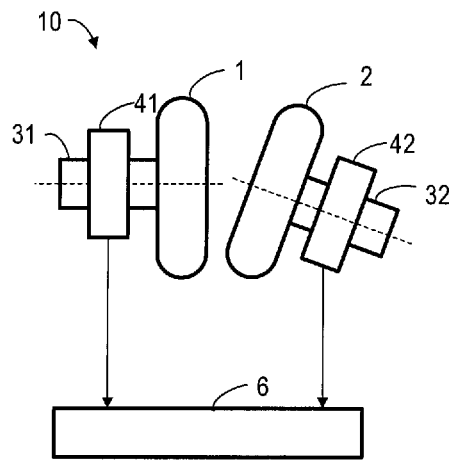
FIG. 4 shows a schematic view of a scroll wheel assembly according to an implementation of the subject matter described herein.
Figure 5:
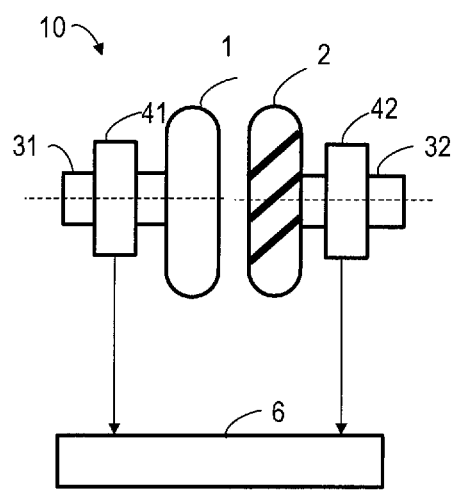
FIG. 5 shows a schematic view of a scroll wheel assembly according to another implementation of the subject matter described herein.

FIG. 4 shows a schematic view of a scroll wheel assembly 10 as shown FIG. 2A. As shown, to convert the rotation of the wheel to the scroll of an object on the display screen 200, in some implementations, a first encoder 41 is coupled to a first rotation shaft 31 of the first scroll wheel 1. The first encoder 41 is configured to convert a rotation of the first rotation shaft 31 to a signal for controlling the first movement of the object on the display screen. Further, a second encoder 42 is coupled to a second rotation shaft 32 of the second scroll wheel 2. The second encoder 42 is configured to convert a rotation of the second rotation shaft 32 to a signal for controlling the second movement of the object on the display screen. In some implementations, both the first encoder 41 and the second encoder 42 can be communicatively coupled to a controller 6 associated with the wheel assembly 10. Such configuration of double rotation shafts with double encoders may likewise be applied on the scroll wheel assembly 10 as shown FIG. 3A. FIG. 5 shows a schematic view of a scroll wheel assembly 10 as shown FIG. 3A.

In such double-shaft configuration, the existing design of the first wheel 1 along with its encoding mechanism can be maintained. In other words, an independent design of the second scroll wheel 2 along with its encoding mechanism from that of the first wheel 1 can be expected, which may enable a modular design for the wheel assembly.

Figure 6:
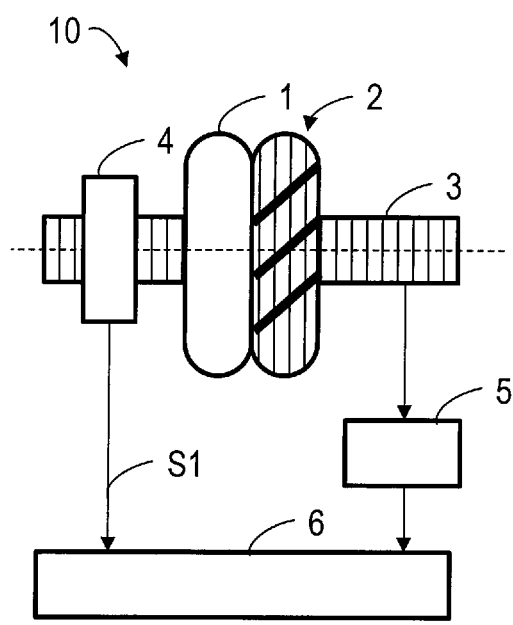
FIG. 6 shows yet another schematic view of a scroll wheel assembly according to yet another implementation of the subject matter described herein.

FIG. 6 shows another schematic view of a scroll wheel assembly 10 as shown in FIG. 3A. In this design, the first scroll wheel 1 and the second scroll wheel 2 share a common rotation shaft 3 and are coaxially arranged on the rotation shaft 3. Further, the scroll wheel assembly 10 is only equipped with one encoder 4 that is coupled to the rotation shaft 3 and configured to convert a rotation of the rotation shaft 3 to a first signal S1 for controlling a movement of the object on the display screen. In this case, no matter which scroll wheel is touched, the other non-touched scroll wheel will always rotate along with the rotation of the touched wheel. Therefore, in order to differentiate the touch on the first wheel 1 from the touch on the second scroll wheel 2, a sensor 5 is arranged in association with the second scroll wheel (2) in this design.

Such sensor 5 is configured to detect a touch of the finger 300 on the second scroll wheel 2. For example, in some implementations, when the touch is detected on the second scroll wheel 2, the sensor 5 can detect the touch and send to the controller 6 an indication that the second scroll wheel is touched. With such indication, the controller 6 can identify that the second scroll wheel is being touched and thus interpret the first signal S1 as the second movement, for example, the horizontal scroll of the object. Otherwise, in some implementations, when no touch on the second scroll wheel 2 is detected, the sensor 5 will send no instruction or send an indication that the first scroll wheel 1 is touched to the controller 6. With such indication, the controller 6 can interpret first signal S1 as the first movement, for example, the vertical scroll of the object shown in the display screen 200.

In some implementations, the first scroll wheel 1 can be made of a non-conductive material, and the second scroll wheel 2 and the rotation shaft 3 can both be made of a conductive material, such as conductive rubber, conductive plastic, metal, etc. In this example, the conductive material is indicated by the shaded area. In this case, the sensor 5 can be configured to sense the touch on the second scroll wheel by detecting a conductivity of the second scroll wheel 2. Other types of touch sensitive surfaces of the second scroll wheel 2 such as resistive, capacitive, and/or optical sensitive surface are also possible, and the type of touch sensitive surfaces should not suggest any limitations as to the scope of the subject matter described herein The controller 6 herein can be implemented as one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like. The controller 6 here can also be implemented as a general-purpose computer, special purpose computer, or other programmable data processing apparatus including the program code.

As discussed above, this configuration with the first and second scroll wheels arranged in parallel and close to each other can reduce the total width of the wheel assembly 10. In addition, such configuration can be easily integrated with the existing mouse device by simply adding a second scroll wheel 2 and a sensor 5.

Figure 7A:
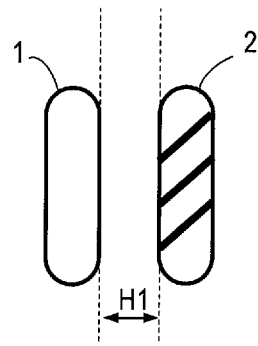
FIG. 7A shows a scroll wheel assembly according to an implementation of the subject matter described herein, with a first wheel and a second scroll wheel being separated by a distance.
Figure 7B:
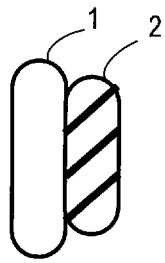
FIG. 7B shows a scroll wheel assembly according to an implementation of the subject matter described herein, with a second scroll wheel having a smaller diameter than that of the first wheel.
Figure 7C:
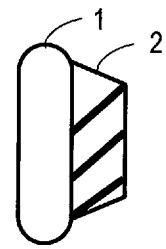
FIG. 7C shows a scroll wheel assembly according to an implementation of the subject matter described herein, with the second scroll wheel 2 including a tapered surface.

FIGS. 7A-7C show some modifications on the scroll wheel assembly 10 as shown in FIG. 3A. In some implementations, as shown in FIG. 7A, the second scroll wheel 2 can be separated from the first scroll wheel 1 by a first distance H1 in the second direction X. In some implementations, as shown in FIG. 7B, the second scroll wheel 2 has a second diameter that is smaller than a first diameter of the first scroll wheel 1. In some implementations, as shown in FIG. 7C, the second scroll wheel 2 may include a tapered surface extending along the second direction X and away from the first scroll wheel 1. Those modifications, either alone or in combination may facilitate the visual and haptic identification of the second scroll wheel 2, which is beneficial for correctly and quickly locating the finger 300 on the second scroll wheel 2. As such, an unexpected mis-operation among both scroll wheels can be effectively prevented.

It is to be understood that although the above example is described with reference to an arrangement where the second scroll wheels 2 is arranged on the right side of the first wheel 1, this is merely for illustration without suggesting any limitations as to the scope of the subject matter described herein. The second scroll wheel 2 can also be arranged on the left side of the first wheel 1 for the use by the left-handed users.

FIGS. 8A-8D illustrate some other modifications on the scroll wheel assembly 10 as shown in FIG. 3A. In some implementations, as illustrated in FIGS. 8A-8D, the at least one second scroll wheel 2 may include two scroll wheels $2_1$, $2_2$ arranged on different sides of the first scroll wheel 1. In this example, the scroll wheel $2_1$ and the scroll wheel $2_2$ are arranged on left side and right side, respectively. Such design enables a convenient use for both left-handed users and right-handed users.

Furthermore, the orientation of the surface structure can be designed based on user's preferences. Basically, with respective to the orientation of the first wheel 1, the upward slanted pattern will give the user a right scroll feeling upon the finger 300 is moving upward. The downward slanted pattern will give the user a left scroll feeling upon the finger 300 is moving upward. Similarly, the upward slanted pattern will give the user a left scroll feeling upon the finger 300 is moving downward. The downward slanted pattern will give the user a right scroll feeling upon the finger 300 is moving downward.

Figure 8A:
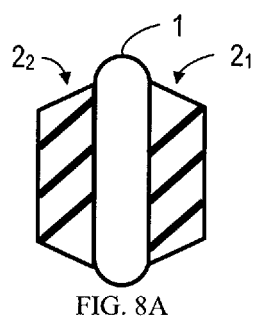
FIGS. 8A-8D shows various scroll wheel assemblies according various implementations of the subject matter described herein, with two scroll wheels arranged on different sides of a first scroll wheel.
Figure 8B:
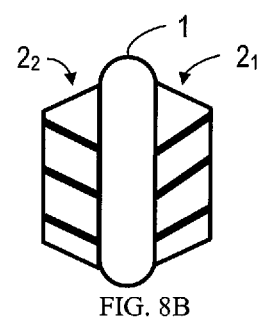
Figure 8C:
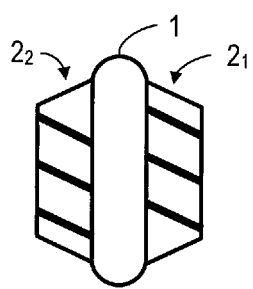
Figure 8D:
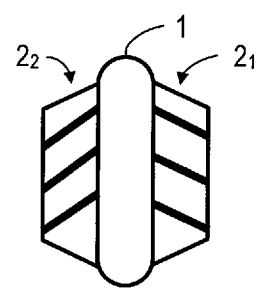

FIGS. 8A-8D illustrate all four combinations of two scroll wheels $2_1$ and $2_2$ with various pattern orientations. Specifically, FIG. 8A shows two scroll wheels $2_1$ and $2_2$ both having the upward slanted patterns. FIG. 8C shows two scroll wheels $2_1$ and $2_2$ both having the downward slanted patterns. FIG. 8B shows two scroll wheels $2_1$ and $2_2$ with the scroll wheel $2_1$ having upward slanted patterns and the scroll wheel $2_2$ having the downward slanted patterns. FIG. 8D shows two scroll wheels $2_1$ and $2_2$ with the scroll wheel $2_1$ having downward slanted patterns and the scroll wheel $2_2$ having the upward slanted patterns.

Hereinafter, some example implementations of the subject matter described herein will be listed.

In some implementations, a scroll wheel assembly for use with a pointing device is provided. The scroll wheel assembly comprises: a first scroll wheel operable to, in response to receiving a first scroll manipulation applied in a first direction, generate a first signal to a controller of a pointing device for controlling a first movement of an object on a user interface, the first scroll wheel being arranged in a first direction; and at least one second scroll wheel operable to, in response to receiving a second scroll manipulation applied substantially in the first direction, generate a second signal to the controller for controlling a second movement of the object on the user interface, and provide a haptic feedback in a second direction that is substantially perpendicular to the first direction.

In some implementations, the second scroll wheel is adjustably arranged in a third direction deviating from the first direction by a first degree.

In some implementations, the first degree is in a range of 15 to 35 degrees.

In some implementations, the second scroll wheel is arranged in the first direction and comprises at least one surface structure extending in a fourth direction deviating from an orientation of the second scroll wheel by a second degree.

In some implementations, the at least one surface structure comprises a rib and a trench.

In some implementations, the second degree is approximately 45 degrees.

In some implementations, an encoder is coupled to a rotation shaft and configured to convert a rotation of the rotation shaft to the first signal for controlling a movement of the object on the user interface, wherein the first scroll wheel and the second scroll wheel are coaxially arranged on the rotation shaft; a sensor is arranged in association with the second scroll wheel and configured to detect a touch of a finger on the second scroll wheel; and in response to detecting the touch, send an indication that the second scroll wheel is touched; and the controller is configured to in response to receiving the first signal and the indication that the second scroll wheel is touched, enable the second movement of the object on the user interface.

In some implementations, the first scroll wheel is made of a non-conductive material, and the second scroll wheel and the rotation shaft are made of a conductive material, and wherein the sensor is configured to sense the touch by detecting a conductivity of the second scroll wheel.

In some implementations, the conductive material is selected from at least one of: conductive rubber, conductive plastic, and metal.

In some implementations, the second scroll wheel is separated from the first scroll wheel by a first distance in the second direction.

In some implementations, the at least one second scroll wheel comprises scroll wheels arranged on different sides of the first scroll wheel.

In some implementations, the second scroll wheel has a second diameter that is smaller than a first diameter of the first scroll wheel.

In some implementations, the second scroll wheel comprises a tapered surface extending along the second direction and away from the first scroll wheel.

In some implementations, the first direction is a vertical direction, and the second direction is a horizontal direction.

In some implementations, a pointing device is provided. The pointing device comprises a controller and a scroll wheel assembly. The scroll wheel assembly comprises: a first scroll wheel operable to, in response to receiving a first scroll manipulation applied in a first direction, generate a first signal to the controller of a pointing device for controlling a first movement of an object on a user interface, the first scroll wheel being arranged in a first direction; and at least one second scroll wheel operable to, in response to receiving a second scroll manipulation applied substantially in the first direction, generate a second signal to the controller for controlling a second movement of the object on the user interface, and provide a haptic feedback in a second direction that is substantially perpendicular to the first direction.

In some implementations, the second scroll wheel is adjustably arranged in a third direction deviating from the first direction by a first degree.

In some implementations, the second scroll wheel is arranged in the first direction and comprises at least one surface structure extending in a fourth direction deviating from an orientation of the second scroll wheel by a second degree.

In some implementations, the pointing device further comprises: an encoder coupled to a rotation shaft and configured to convert a rotation of the rotation shaft to a first signal for controlling a movement of the object on the user interface, wherein the first scroll wheel and the second scroll wheel are coaxially arranged on the rotation shaft; and a sensor arranged in association with the second scroll wheel and configured to detect a touch of a finger on the second scroll wheel; and in response to detecting the touch, send an indication that the second scroll wheel is touched; and wherein the controller is configured to in response to receiving the first signal and the indication that the second scroll wheel is touched, enable the second movement of the object on the user interface.

In some implementations, the first scroll wheel is made of a non-conductive material, and the second scroll wheel and the rotation shaft are made of a conductive material, and wherein the sensor is configured to sense the touch by detecting a conductivity of the second scroll wheel.

In some implementations, the conductive material is selected from at least one of: conductive rubber, conductive plastic, and metal.

In some implementations, a scroll wheel assembly for use with a pointing device is provided. The scroll wheel assembly comprises: a first scroll wheel operable to, in response to receiving a first scroll manipulation applied in a first direction, generate a first signal to a controller of a pointing device for controlling a first movement of an object on a user interface, the first scroll wheel being arranged in a first direction; a second scroll wheel operable to, in response to receiving a second scroll manipulation applied substantially in the first direction, generate a second signal to the controller for controlling a second movement of the object on the user interface, the second scroll wheel is adjustably arranged in a third direction having a non-90 first degree with respect to the first direction; a first encoder coupled to a first rotation shaft of the first scroll wheel, and configured to convert a rotation of the first rotation shaft to a signal for controlling the first movement of the object on the user interface; and a second encoder coupled to a second rotation shaft of the second scroll wheel and configured to convert a rotation of the second rotation shaft to a signal for controlling the second movement of the object on the user interface.

What is claimed is:

1. A pointing device (100) comprising:
  a first scroll member (1) operable to, in response to receiving a first scroll manipulation applied in a first direction (Y), rotate for controlling a first movement of an object on a user interface in the first direction, the first scroll member (1) arranged in the first direction (Y); and
  at least one second scroll member (2) operable to, in response to receiving a second scroll manipulation applied substantially in the first direction (Y), rotate for controlling a second movement of the object on the user interface in a second direction (X) and provide a haptic feedback in the second direction (X), the second direction being substantially perpendicular to the first direction (Y), wherein the at least one second scroll member (2) is arranged in a third direction, the third direction having an acute angle of less than 90 degrees with respect to the first direction (Y), wherein the haptic feedback corresponds in part to the acute angle.

2. The pointing device (100) of claim 1, wherein the second scroll member (2) is operable to, in response to receiving a first force caused by the second scroll manipulation applied on the second scroll member (2) substantially in the first direction (Y), generate a component of a second force in the second direction (X) to provide the haptic feedback, the second force being a counterforce of the first force.

3. The pointing device (100) of claim 1, wherein the first scroll member (1) and the second scroll member (2) are coaxially arranged, and the pointing device (100) further comprises:
an encoder (4) configured to convert a rotation to a first signal (S1) for indicating a movement of the object on the user interface;
a sensor (5) arranged in association with the second scroll member (2) and configured to detect a scroll manipulation applied on the second scroll member (2); and
in response to detecting the scroll manipulation, send an indication that the scroll manipulation is applied on the second scroll member; and
a controller (6) configured to
in response to receiving the first signal (S1) and the indication that the scroll manipulation is applied on the second scroll member, enable the second movement of the object on the user interface.

4. The pointing device (100) of claim 1, wherein the at least one second scroll member (2) comprises scroll members ($2_1$, $2_2$) arranged on different sides of the first scroll member (1).

5. The pointing device (100) of claim 1, wherein the second scroll member has a second diameter that is smaller than a first diameter of the first scroll member (1).

6. The pointing device (100) of claim 1, wherein the second scroll member (2) comprises a tapered surface extending along the second direction (X) and away from the first scroll member (1).

7. A scroll assembly (10) for use with a pointing device (100), comprising:
a first scroll member (1) operable to, in response to receiving a first scroll manipulation applied in a first direction (Y), generate a first signal to a controller (6) of the pointing device (100) for controlling a first movement of an object on a user interface in the first direction (Y), the first scroll member (1) arranged in the first direction (Y); and
at least one second scroll member (2) operable to, in response to receiving a second scroll manipulation applied substantially in the first direction (Y), generate a second signal to the controller (6) for controlling a second movement of the object on the user interface in a second direction (X), and provide a haptic feedback in the second direction (X), the second direction being substantially perpendicular to the first direction (Y), wherein the at least one second scroll member (2) is arranged in a third direction, the third direction having an acute angle of less than 90 degrees with respect to the first direction (Y), wherein the haptic feedback corresponds in part to the acute angle.

8. The scroll assembly (10) of claim 7, wherein the second scroll member (2) is adjustably arranged in a third direction, the third direction deviating from the first direction (Y) with a first component extending along the second direction (X).

9. The scroll assembly (10) of claim 8, wherein the second scroll member (2) is adjustably arranged in the third direction deviating from the first direction (Y) by a first degree (3) in a range of 15 to 35 degree.

10. The scroll assembly (10) of claim 7, wherein the second scroll member (2) is arranged in the first direction (Y) and comprises at least one surface structure (21) extending in a fourth direction, the fourth direction deviating from the first direction (Y) with a second component extending along the second direction (X).

11. The scroll assembly (10) of claim 10, wherein the at least one surface structure (21) comprises a rib and a trench.

12. The scroll assembly (10) of claim 10, wherein the fourth direction deviates from the first direction (Y) by a second degree ($\theta$) of approximately 45 degree.

13. The scroll assembly (10) of claim 10, wherein the second scroll member (2) separated from the first scroll member (1) by a first distance (X1) in the second direction (X).

14. The scroll assembly (10) of claim 7, wherein the at least one second scroll member (2) comprises scroll members ($2_1$, $2_2$) arranged on different sides of the first scroll member (1).

15. The scroll assembly (10) of claim 7, wherein the second scroll member (2) comprises a tapered surface extending along the second direction (X) and away from the first scroll member (1).

16. A mouse, comprising:
a controller (6) for controlling movements of an object on a user interface;
a first scroll wheel (1) operable to, in response to receiving a first scroll manipulation applied in a first direction, generate a first signal to the controller (6) for controlling a first movement of an object on a user interface in a first direction (Y), the first scroll wheel (1) arranged in the first direction (Y); and
a second scroll wheel (2) operable to, in response to receiving a second scroll manipulation applied substantially in the first direction (Y), generate a second signal to the controller (6) for controlling a second movement of the object on the user interface in a second direction (X), the second direction (X) being substantially perpendicular to the first direction (Y), wherein the at least one second scroll wheel (2) is arranged in a third direction, the third direction having an acute angle of less than 90 degrees with respect to the first direction (Y), wherein the second signal corresponds in part to the acute angle.

17. The mouse of claim 16, further comprising:
a first encoder (41) coupled to a first rotation shaft (31) of the first scroll wheel (1), and configured to convert a rotation of the first rotation shaft (31) to a signal for indicating the first movement of the object on the user interface; and
a second encoder (42) coupled to a second rotation shaft (32) of the second scroll wheel (2) and configured to convert a rotation of the second rotation shaft (32) to a signal for indicating the second movement of the object on the user interface.

18. The mouse of claim 16, wherein the first scroll member (1) and the second scroll member (2) are coaxially arranged on a rotation shaft (3), and the pointing device (100) further comprises:
- an encoder (4) configured to convert a rotation to a first signal (S1) for indicating a movement of the object on the user interface;
- a sensor (5) arranged in association with the second scroll member (2) and configured to detect a scroll manipulation applied on the second scroll member (2); and
- in response to detecting the scroll manipulation, send an indication that the scroll manipulation is applied on the second scroll member (2); and
- wherein the controller (6) is configured to
- in response to receiving the first signal (S1) and the indication that the scroll manipulation is applied on the second scroll member, enable the second movement of the object on the user interface.

19. The mouse of claim 18, wherein the first scroll member (1) is made of a nonconductive material, and the second scroll member (2) and the rotation shaft (3) are made of a conductive material, and
- wherein the sensor (5) is configured to sense a touch by detecting a conductivity of the second scroll member (2).

20. The mouse of claim 19, wherein the conductive material is selected from at least one of: conductive rubber, conductive plastic, and metal.

\* \* \* \* \*